(12) United States Patent
Maeda et al.

(10) Patent No.: US 9,768,465 B2
(45) Date of Patent: Sep. 19, 2017

(54) BATTERY MODULE

(71) Applicant: KABUSHIKI KAISHA TOYOTA JIDOSHOKKI, Aichi-ken (JP)

(72) Inventors: Kazuki Maeda, Kariya (JP); Takayuki Kato, Kariya (JP); Shintaro Watanabe, Kariya (JP); Hidefumi Oishi, Kariya (JP); Takashi Sakai, Kariya (JP); Hiromi Ueda, Kariya (JP); Naoto Morisaku, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 183 days.

(21) Appl. No.: 14/765,410

(22) PCT Filed: Feb. 13, 2014

(86) PCT No.: PCT/JP2014/053342
§ 371 (c)(1),
(2) Date: Aug. 3, 2015

(87) PCT Pub. No.: WO2014/126155
PCT Pub. Date: Aug. 21, 2014

(65) Prior Publication Data
US 2015/0364786 A1 Dec. 17, 2015

(30) Foreign Application Priority Data
Feb. 15, 2013 (JP) .................................. 2013-027866

(51) Int. Cl.
*H01M 10/04* (2006.01)
*H01M 2/10* (2006.01)

(52) U.S. Cl.
CPC ..... *H01M 10/0481* (2013.01); *H01M 2/1061* (2013.01); *H01M 2/1077* (2013.01); *H01M 2/1016* (2013.01); *H01M 10/0486* (2013.01)

(58) Field of Classification Search
CPC ..... H01M 2/10; H01M 2/1016; H01M 2/1061
See application file for complete search history.

(56) References Cited

U.S. PATENT DOCUMENTS

2004/0050414 A1* 3/2004 Oogami .............. H01M 2/0207
136/249
2009/0325053 A1 12/2009 Koetting et al.
(Continued)

FOREIGN PATENT DOCUMENTS

| JP | 2004-281099 | 10/2004 |
|----|-------------|---------|
| JP | 2005-259379 | 9/2005 |

(Continued)

OTHER PUBLICATIONS

International Search Report for PCT/JP2014/053342, having a mailing date of Apr. 8, 2014.
(Continued)

*Primary Examiner* — Jeremiah Smith
(74) *Attorney, Agent, or Firm* — Greenblum & Bernstein, P.L.C.

(57) ABSTRACT

A battery module includes a battery assembly having battery structures arranged side by side, the battery structures each having a battery body and a battery holder, and a pressure application member. Each battery holder has a first surface, a second surface, a projecting portion, which projects from the first surface and has a distal end face, and a receptacle portion recessed in the second surface. The projecting portion of each battery holder is inserted into the receptacle portion of the adjacent battery holder in a state in which the distal end face is free of contact with the adjacent battery holder. Each battery body contacts the adjacent battery body such that at least one of the first and second surfaces of the battery holder, which holds a battery body, is free from contact with the adjacent battery holder.

6 Claims, 3 Drawing Sheets

(56) References Cited

U.S. PATENT DOCUMENTS

| | | | |
|---|---|---|---|
| 2010/0190049 A1 | 7/2010 | Kawase et al. | |
| 2012/0021271 A1* | 1/2012 | Tople ................ | H01M 10/0481 429/120 |
| 2012/0052359 A1 | 3/2012 | Yoshitake et al. | |

FOREIGN PATENT DOCUMENTS

| | | |
|---|---|---|
| JP | 2011-526727 | 10/2011 |
| JP | 2012-216312 | 11/2012 |
| KR | 10-2012-0033044 | 4/2012 |
| WO | 2009/014071 | 1/2009 |
| WO | 2010/131700 | 11/2010 |

OTHER PUBLICATIONS

International Preliminary Report on Patentability for PCT/JP2014/053342 having an issuance date of Aug. 18, 2015.
English-language translation of the Written Opinion of the International Searching Authority for PCT/JP2014/053342 having a mailing date of Apr. 8, 2015.
Official Action issued in EP Appl. No. 14 752 145.4 dated Jul. 19, 2017.

* cited by examiner

BATTERY MODULE

TECHNICAL FIELD

The present invention relates to a battery module that includes a battery assembly and a pressure application member that applies pressure to the battery assembly.

BACKGROUND ART

As a battery module having batteries that are arranged side by side and held by battery holders, the one disclosed in Patent Document 1 is known.

The bipolar battery disclosed in Patent Document 1 includes frames (battery holders) that tightly hold a current collector. Each frame has a coupling portion for being coupled to adjacent other frames. The coupling portion has a protrusion and a recess, and the protrusion of each frame is inserted into the recess of the adjacent frame. The coupling portion has holes, which receives rod-like support bodies. The support bodies couple the frames and the current collectors to each other.

PRIOR ART DOCUMENT

Patent Document

Patent Document 1: Japanese Laid-Open Patent Publication No. 2005-259379

SUMMARY OF THE INVENTION

Problems that the Invention is to Solve

To suppress deterioration of rechargeable batteries, some battery modules are equipped with pressure application members for applying pressure to rechargeable batteries. In such a case, if the opposite end faces of each battery holder (frame), which intersect with the arrangement direction of the rechargeable batteries, each contact an adjacent battery holder (frame) in the arrangement direction of the rechargeable batteries, load is applied to the battery holders and is less likely to be applied to the rechargeable batteries.

Accordingly, it is an objective of the present invention to provide a battery module that is capable of position each adjacent pair of battery cells relative to each other and properly applying pressure to battery cells.

Means for Solving the Problems

To achieve the foregoing objective and in accordance with one aspect of the present invention a battery module including a battery assembly and a pressure application member is provided. The battery assembly has a plurality of battery structures, which are arranged side by side. Each battery structure includes a battery body, which has a battery cell, and a battery holder, which holds the battery body. The pressure application member, which applies pressure to the battery assembly in a direction in which the battery structures are arranged side by side. Each battery holder includes a first surface, which intersects with the arrangement direction of the battery structures, a second surface, which is located on a side opposite to the first surface, a projecting portion, which projects from the first surface in the arrangement direction of the battery structures and has a distal end face, and a receptacle portion, which is recessed in the second surface in the arrangement direction of the battery structures. The projecting portion of each battery holder is inserted into the receptacle portion of adjacent one of the battery holders in a state in which the distal end face of the projecting portion is free of contact with the adjacent battery holder. Each battery body contacts adjacent one of the battery bodies such that at least one of the first and second surfaces of the battery holder that holds the battery body is free of contact with the adjacent battery holder.

MODES FOR CARRYING OUT THE INVENTION

A battery module according to one embodiment will now be described.

Figure 1:
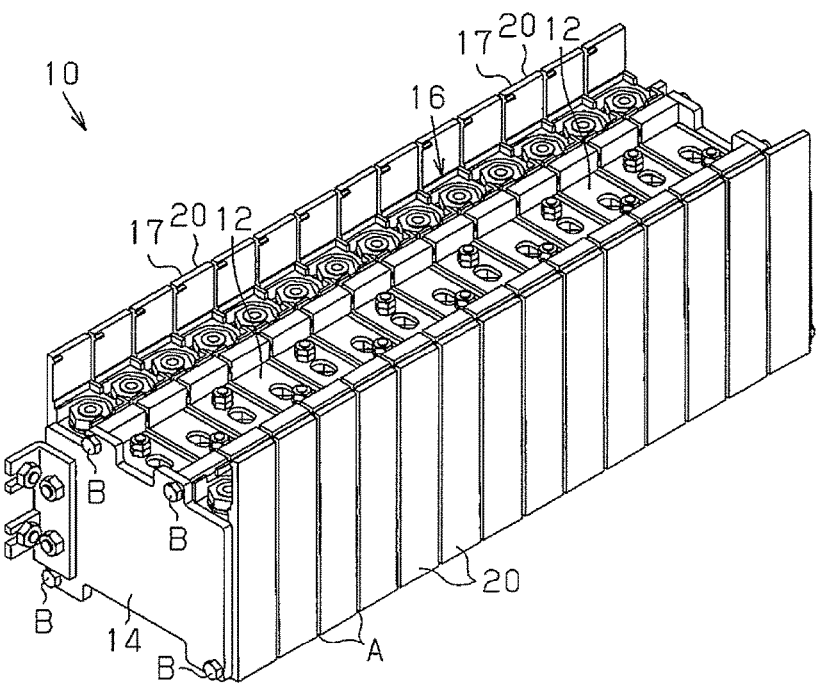
FIG. 1 is a perspective view illustrating a battery module according to one embodiment.
Figure 2:
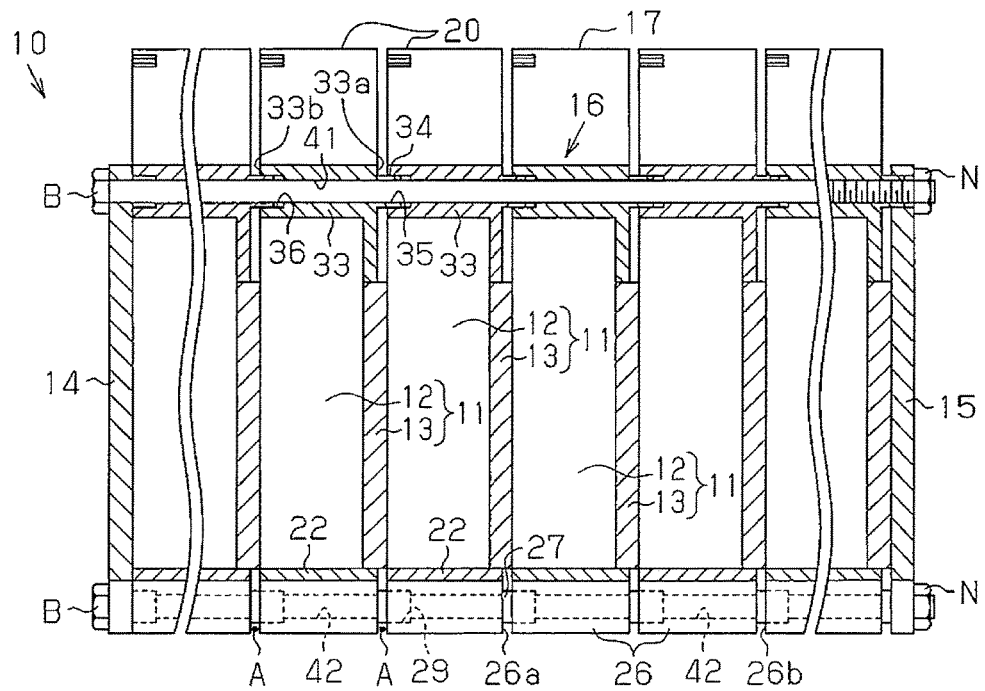
FIG. 2 is a cross-sectional view illustrating the battery module of FIG. 1.

As shown in FIGS. 1 and 2, a battery module 10 includes a battery assembly 16. The battery assembly 16 includes battery structures 17, which are arranged side by side. Each battery structure 17 has a battery body 11 and a battery holder 20, which holds the battery body 11. The battery body 11 has a battery cell, which is a prismatic battery 12 (for example, a lithium-ion rechargeable battery or a nickel-hydrogen battery), and a pressure application plate 13, which is adjacent to the prismatic battery 12 in the thickness direction of the battery 12. The battery structures 17 are arranged side by side such that the prismatic batteries 12 and the pressure application plates 13 are arranged alternately.

End plates 14, 15 for holding the battery assembly 16 are provided at opposite ends of the battery assembly 16 in the arrangement direction of the battery structures 17. The battery module 10 has bolts B, which are inserted from the end plate 14 and through all the battery holders 20. The bolts B are threaded to nuts N on the outer side of the end plate 15, so that the battery module 10 is assembled. The end plates 14, 15 are restrained by the nuts N and the bolts B form both sides in the arrangement direction of the battery structures 17. Therefore, the battery assembly 16 is pressurized in the arrangement direction of the battery structures 17 by the end plates 14, 15, which serve as pressure application members.

Figure 3A:
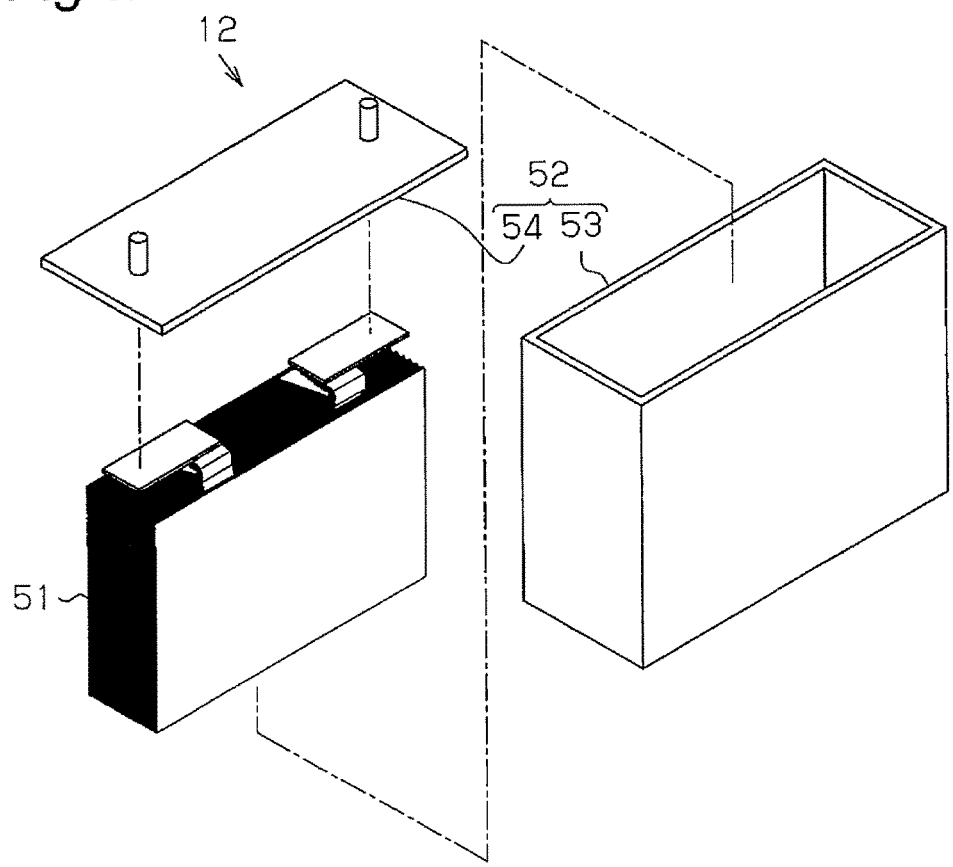
FIG. 3A is an exploded perspective view illustrating a prismatic battery in the battery module of FIG. 1.

As shown in FIG. 3A, each prismatic battery 12 includes an electrode assembly 51 and a case 52, which accommodates the electrode assembly 51. The case 52 includes a rectangular box-like case body 53 and a rectangular plate-like lid member 54. The case body 53 accommodates the electrode assembly 51 and the lid member 54 closes the opening of the case body 53.

Figure 3B:
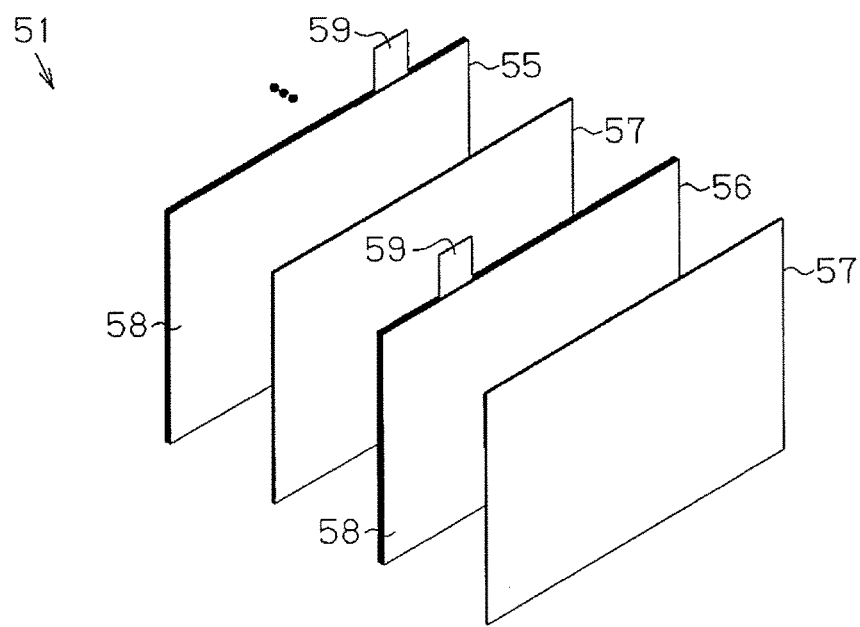
FIG. 3B is an exploded perspective view illustrating an electrode assembly.

As shown in FIG. 3B, the electrode assembly 51 includes positive electrodes 55, negative electrodes 56, and separators 57. Each separator 57 is arranged between the positive electrode 55 and the negative electrode 56 of an adjacent pair thereof. The positive electrodes 55 and the negative electrodes 56 each include a rectangular active material layer 58 and a tab 59. The active material layer 58 is formed by applying an active material to a metal foil, and the tab 59 extends from an edge of the metal foil.

Figure 4A:
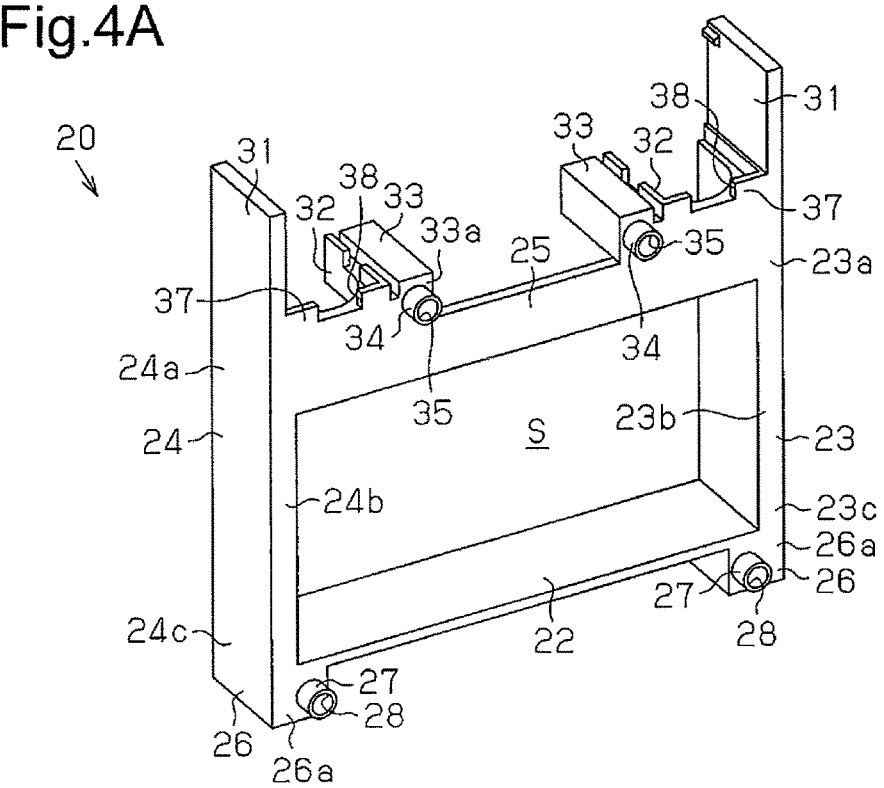
FIGS. 4A and 4B are perspective view of a battery holder in the battery module of in FIG. 1.
Figure 4B:
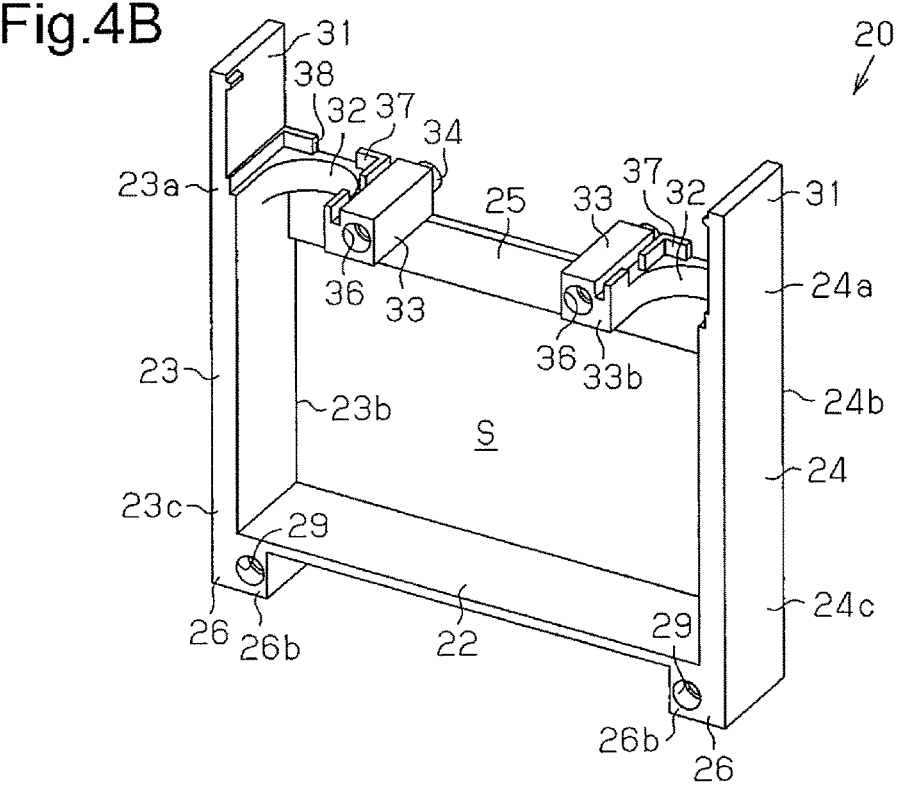

As shown in FIGS. 4A and 4B, each battery holder 20 includes a rectangular plate-like first covering portion 22. The first covering portion 22 has, at the opposite ends in the longitudinal direction, rectangular plate-like second and third covering portions 23, 24. The second and third covering portions 23, 24 extend in the thickness direction of the first covering portion 22. A rectangular-plate like fourth covering portion 25 is provided at a first edge section 23a in the longitudinal direction of the second covering portion 23 (an edge section that is opposite to the edge section at which the first covering portion is provided 22) and a first edge section 24a in the longitudinal direction of the third covering portion 24 (an edge section that is opposite to the edge section at which the first covering portion 22 is provided). The fourth covering portion 25 extends in the transverse direction of the covering portions 23, 24 between first edge sections 23b, 24b. The thickness direction of the fourth covering portion 25 agrees with the transverse direction of the second and third covering portions 23, 24. The longitudinal direction of the fourth covering portion 25 agrees with the direction in which the second and third covering portions 23, 24 face each other. The direction perpendicular to the thickness direction and the longitudinal direction of the fourth covering portion 25 is the transverse direction of the fourth covering portion 25. The region surrounded by the first covering portion 22, the second covering portion 23, and the third covering portion 24 serves as an accommodating portion S.

Also, a terminal accommodating portion 32 is provided at each of the opposite ends in the longitudinal direction of the fourth covering portion 25. Specifically, the terminal accommodating portions 32 are located on the end face in the transverse direction of the fourth covering portion 25. Each terminal accommodating portion 32 is U-shaped and opens in the thickness direction of the fourth covering portion 25. Each terminal accommodating portion 32 is formed continuously with the corresponding one of the second and third covering portions 23, 24.

Each terminal accommodating portion 32 has a wall member 37, which projects from the surface opposite to the surface joined to the fourth covering portion 25. Each wall member 37 has a cutout 38.

Two quadrangular prism-like pillar members 33 are provided on an end face in the transverse direction of the fourth covering portion 25. Each pillar member 33 is adjacent to one of the terminal accommodating portions 32. The axes of the pillar members 33 extend in the transverse direction of the second and third covering portions 23, 24. Each pillar member 33 has a circular projecting portion 34 on a first end face 33a in the axial direction. The projecting portion 34 has a through hole 35. That is, the projecting portion 34 has a cylindrical shape. Also, the pillar member 33 has a circular receptacle portion 36 on a second end face 33b in the axial direction. The receptacle portion 36 is recessed in the axial direction. The diameter of the receptacle portions 36 is larger than the outer diameter of the projecting portions 34. The axial dimension of the pillar member 33 at the projecting portion 34 is less than the axial dimension of the pillar member 33 at the receptacle portion 36.

A support portion 31 is formed continuously with each of the first longitudinal edge sections 23a, 24a of the second covering portion 23 and the third covering portion 24. The support portions 31 extend in the longitudinal direction of the covering portions 23, 24. Also, quadrangular prism-like leg 26 is provided at each of second longitudinal edge sections 23c, 24c of the second covering portion 23 and the third covering portion 24. The axes of the legs 26 extend in the transverse direction of the covering portions 23, 24. Each leg 26 has a circular projecting portion 27 on a first end face 26a in the axial direction (one of the surfaces intersecting the transverse direction of the covering portions 23, 24). The projecting portion 27 has a through hole 28. That is, the projecting portion 27 has a cylindrical shape. Also, each leg 26 has a circular receptacle portion 29 in a second end face 26b in the axial direction (the other one of the surfaces intersecting the transverse direction of the covering portions 23, 24). The receptacle portion 29 is recessed in the axial direction of the leg 26. The first axial end faces 26a of the legs 26 face in the same direction as the first axial end faces 33a of the pillar members 33, and the second axial end faces 26b of the legs 26 face in the same direction as the second axial end faces 33b of the pillar members 33. The diameter of the receptacle portions 29 is larger than the outer diameter of the projecting portions 27. The axial dimension of the leg 26 at the projecting portion 27 is less than the axial dimension of the leg 26 at the receptacle portion 29.

As shown in FIG. 2, the battery holders 20 are arranged side by side such that the transverse direction of the first covering portions 22, the second covering portions 23, and the third covering portions 24, the axial direction of the legs 26 and the pillar members 33, and the arrangement direction of the battery structures 17 agrees with one another.

The receptacle portion 36 and the through hole 35 in each pillar member 33 are connected to each other by a communication hole 41, which extends in the axial direction of the pillar member 33. The diameter of the communication hole 41 is less than the diameter of the receptacle portion 36 and equal to the diameter of the through hole 35. The through hole 28 and the receptacle portion 29 of each leg 26 are also connected to each other by a communication hole 42. The surface of each battery holder 20 that includes the first axial end faces 26a of the legs 26 and the first axial end faces 33a of the pillar members 33, on which the projecting portions 27, 34 are formed, will be referred to as a first surface of the battery holder 20, which intersects with (more specifically, is perpendicular to) the arrangement direction of the battery structures 17. Also, the surface of each battery holder 20 that includes the second axial end faces 26b of the legs 26 and the second axial end faces 33b of the pillar members 33, on which the projecting portions 29, 36 are formed, will be referred to as a second surface of the battery holder 20, which intersects with (more specifically, is perpendicular to) the arrangement direction of the battery structures 17. These first and second surfaces are the surfaces on the opposite sides of the battery holder 20 in the arrangement direction of the battery structures 17.

The projecting portions 27, 34 of each battery holder 20 are inserted in the receptacle portions 29, 36 of an adjacent battery holder 20. Since the dimensions of the projecting portions 27, 34 in the arrangement direction of the battery structures 17 are less than the dimensions of the receptacle portions 29, 36 in the arrangement direction of the battery structures 17, the distal end faces of the projecting portions 27, 34 do not contact the adjacent battery holder 20.

The transverse dimension of each of the first covering portion 22, the second covering portion 23, and the third covering portion 24 (the dimension in the arrangement direction of the battery structures 17) is less than the combined thickness of the prismatic battery 12 and the pressure application plate 13. Thus, when the accommodating portion S accommodates the prismatic battery 12 and the pressure application plate 13, a part of the pressure application plate 13 protrudes from the accommodating portion S in the projection direction of the projecting portions 27, 34. The protruding pressure application plate 13 contacts a surface of the adjacent prismatic battery 12 that intersects the thickness direction of the adjacent prismatic battery 12. That is, the battery bodies 11 of each adjacent pair contact each other in the arrangement direction. Thus, a space A is provided between the first surface and the second surface of the battery holders 20 of each adjacent pair thereof, which face each other in the arrangement direction of the battery structures 17. The space A does not allow pressure to be transmitted between the battery holders 20 in the arrangement direction of the battery structures 17. That is, the battery bodies 11 function as pressure application preventing members, which prevent the battery holders 20 from receiving pressure. The state in which battery bodies 11 contact each other includes not only the case in which the battery bodies 11 contact each other directly, but also a case in which grease or an insulation sheet is located between the battery bodies 11. That is, the case in which the battery bodies 11 of each adjacent pair thereof contact each other refers to a state in which pressure applied by the end plates 14, 15 can be transmitted between the adjacent battery bodies 11.

Each battery holder 20 is slidable in the arrangement direction of the battery structures 17 in an area corresponding to the space A. The first surface and the second surface of the battery holders 20 of each adjacent pair thereof can be brought into contact by sliding one of the battery holders 20 toward one side in the arrangement direction of the battery structures 17. However, when a battery holder 20 is slid toward one side in the arrangement direction of the battery structures 17 so that one of the first surface and the second surface contacts the adjacent battery holder 20, the other of the first and second surfaces cannot be brought into contact with the other adjacent battery holder 20. Thus, if each of three battery holders 20 that are arranged successively in the arrangement direction of the battery structures 17 is slid, the first surface and the second surface of each battery holder 20 never simultaneously contact the adjacent battery holders 20, and any of the three battery holder 20 will be adjacent to a space A without exception. Therefore, even if any of the battery holders 20 is slid to cause two of the battery holders 20 contact each other, the space A between the adjacent battery holders 20 will never prevent the battery bodies 11 from being pressurized.

Operation of the battery module 10 of the present embodiment will now be described.

The battery bodies 11 are pressurized in the arrangement direction of the battery structures 17 by the end plates 14, 15, which are located at the opposite ends in the arrangement direction of the battery structures 17. While the battery bodies 11 of each adjacent pair thereof contact each other, the first surface and the second surface of each battery holder 20 never simultaneously contact the adjacent battery holders 20. Thus, the load applied to the end plates 14, 15 is not applied to the battery holders 20, but is applied to the battery bodies 11.

Repetitive charge and discharge of the prismatic battery 12 can widen the clearances between the positive electrode 55 and the negative electrodes 56. Widened clearances will increase the resistance value and thus increase the joule heat. Thus, to prevent the clearances between the positive electrodes 55 and the negative electrodes 56 from widening, pressure is externally applied to the prismatic battery 12 to push the case 52, so that the electrode assembly 51 is pressed.

The above described embodiment has the following advantages.

(1) Each battery holder 20 has projecting portions 27, 34 and receptacle portions 29, 36, into which projecting portions 27, 34 are inserted. When the battery holders 20 are assembled, the projecting portions 27, 34 of each battery holder 20 are inserted into the receptacle portions 29, 36 of the adjacent battery holder 20, so that the battery bodies 11 (the prismatic batteries 12) are positioned. The battery bodies 11 of each adjacent pair thereof contact each other without the corresponding battery holders 20 contacting each other. Thus, the load applied by the end plates 14, 15 is not applied to the battery holders 20, but is likely to be applied to the battery bodies 11. This allows the battery bodies 11 to be positioned and the prismatic batteries 12 to be properly pressurized.

(2) Each battery body 11 has a prismatic battery 12 and a pressure application plate 13, which is arranged side by side with the prismatic battery 12. Thus, the area of the prismatic battery 12 to be pressurized can be adjusted by adjusting the size of the pressure application plate 13. More specifically, the electrode assembly 51 can be properly pressurized by adjusting the size of the pressure application plate 13 to apply pressure to the electrode assembly 51.

(3) The battery assembly 16 is pressurized by the end plates 14, 15, which are located at the opposite ends in the arrangement direction of the battery structures 17. Since the end plates 14, 15, which restrain the battery structures 17 arranged side by side, are also used as pressure application members, the number of components can be reduced.

(4) The projecting portions 27, 34 are cylindrical, and the receptacle portions 29, 36 and the through holes 28, 35 are connected by the communication hole 41, 42, respectively, so that the receptacle portions 29, 36, the through holes 28, 35, and the communication holes 41, 42 form bolt insertion holes for receiving the bolts B. In a conventional battery holder, when inserting bolts B into bolt insertion holes, the bolts B may be caught at the joint between battery holders 20 of each adjacent pair thereof, which hampers smooth insertion of the bolts B. The battery holders 20 of the embodiment have projecting portions 27, 34, which function as guides for guiding the bolts B, at the communication holes 41, 42 of the battery holders 20 of each adjacent pair thereof. This restrains the bolts B from being caught and thus allows the bolts B to be easily inserted.

(5) Since the battery holders 20 receive no load, the battery holders 20 are unlikely to be deformed. Thus, the holding state of the battery bodies 11 is maintained for an extended period of time.

(6) Since the projecting portions 27, 34 are inserted into the receptacle portion 29, 36, the battery holders 20 are unlikely to be displaced in directions perpendicular to the arrangement direction of the battery structures 17. Thus, the bolts B are unlikely to receive load and thus restrained from being deformed.

The embodiment may be modified as follows.

The battery body 11 does not necessarily need to have the pressure application plate 13. In this case, the prismatic batteries 12 contact each other so that pressure is transmitted between the prismatic batteries 12 of each adjacent pair thereof.

A tapered portion may be formed on the outer peripheral surface of the projecting portions 27, 34 to facilitate insertion into the receptacle portions 29, 36.

An insulation sheet or grease may be provided between each pressure application plate 13 and the corresponding prismatic battery 12.

The shape of the projecting portions 27, 34 may be changed, for example, to a rectangular or pentagonal shape. Also, the projecting portions 27, 34 do not necessarily need to have the through holes 28, but may be solid pillars.

In the above illustrated embodiment, a space A is provided in the entire area between the battery holders 20 of each adjacent pair thereof. However, a space A may be provided in a part of the area between the adjacent battery holders 20. That is, the battery holders 20 of each adjacent pair thereof may partially contact each other.

The end plates 14, 15 may be omitted, and the battery bodies 11, which are arranged side by side, may be accommodated in a box. In such a case, the battery bodies 11 are pressurized by the side walls of the box, so that the box functions as a pressure application member. Also, the bolts B and the nuts N may be omitted, and bands looped over the end plates 14, 15 may be used to apply pressure.

In the above illustrated embodiment, cushioning material may be provided between the battery holders 20 of each adjacent pair thereof without providing the space A between the battery holders 20. In this case, the adjacent battery holders 20 contact the cushioning material. However, since the load applied to the end plates 14, 15 is absorbed by the cushioning material, the load is unlikely to be transmitted between the adjacent battery holders 20. That is, a state in which the battery holders 20 do not contact each other refers to a state in which pressure from the end plate 14, 15 is not transmitted between the battery holders 20 of each adjacent pair thereof (or, if transmitted, to an extent that does not influence the pressurization of the battery bodies 11).

The invention claimed is:

1. A battery module comprising:
a battery assembly having a plurality of battery structures, which are arranged side by side, wherein each battery structure includes a battery body, which has a battery cell, and a battery holder, which holds the battery body; and
a pressure application member, which applies pressure to the battery assembly in an arrangement direction in which the battery structures are arranged side by side, wherein
each battery holder includes
a first surface, which intersects with the arrangement direction of the battery structures,
a second surface, which is located on a side opposite to the first surface,
a projecting portion, which projects from the first surface in the arrangement direction of the battery structures and has a distal end face, and
a receptacle portion, which is recessed in the second surface in the arrangement direction of the battery structures,
the projecting portion of the battery holder of at least one of the plurality of battery structures is inserted into the receptacle portion of the battery holder of an adjacent battery structure of the plurality of battery structures in a state in which the distal end face of the projecting portion of the battery holder of the at least one battery structure is free of contact with the battery holder of the adjacent battery structure, and
the battery body of the at least one battery structure contacts the battery body of the adjacent battery structure such that at least one of the first and second surfaces of the battery holder of the at least one battery structure is free of contact with the battery holder of the adjacent battery structure.

2. The battery module according to claim 1, wherein each plate has a pressure application plate, and
the battery structures are arranged side by side such that the battery cells and the pressure application plates are arranged alternately.

3. The battery module according to claim 1, wherein the pressure application member includes a pair of end plates, which are arranged at opposite ends of the battery assembly in the arrangement direction of the battery structures.

4. A battery module comprising:
a battery assembly having a plurality of battery structures, which are arranged side by side, wherein each battery structure includes a battery body, which has a battery cell, and a battery holder, which holds the battery body; and
a pressure application member, which applies pressure to the battery assembly in an arrangement direction in which the battery structures are arranged side by side, wherein
each battery holder includes
a first surface, which intersects with the arrangement direction of the battery structures,
a second surface, which is located on a side opposite to the first surface,
a projecting portion, which projects from the first surface in the arrangement direction of the battery structures, and
a receptacle portion, which is recessed in the second surface in the arrangement direction of the battery structures,
the projecting portion of the battery holder of at least one of the plurality of battery structures is inserted into the receptacle portion of the battery holder of an adjacent battery structure of the plurality of battery structures, and
a dimension in the arrangement direction of a portion of each battery holder except for the projecting portion is less than a dimension in the arrangement direction of each battery body, and a dimension in the arrangement direction of each projecting portion is less than a dimension in the arrangement direction of each receptacle portion.

5. The battery module according to claim 1, wherein each projecting portion has a cylindrical shape with a through hole,
each battery holder has a communication hole, which extends from the receptacle portion to the projecting portion, and
a bolt is insertable in each receptacle portion, the corresponding one of the through hole, and the corresponding one of communication hole.

6. The battery module according to claim 4, wherein each projecting portion has a cylindrical shape with a through hole,
each battery holder has a communication hole, which extends from the receptacle portion to the projecting portion, and
a bolt is insertable in each receptacle portion, the corresponding one of the through hole, and the corresponding one of communication hole.

* * * * *